US006786543B2

United States Patent
Andersson et al.

(10) Patent No.: US 6,786,543 B2
(45) Date of Patent: Sep. 7, 2004

(54) VEHICLE SEAT RECLINE AND IMPACT CONTROL MECHANISM

(75) Inventors: Christer Andersson, Trollhättan (SE); Odd Jaegtnes, Lödöse (SE)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/278,566

(22) Filed: Oct. 23, 2002

(65) Prior Publication Data

US 2004/0090101 A1 May 13, 2004

Related U.S. Application Data

(60) Provisional application No. 60/352,035, filed on Oct. 25, 2001.

(51) Int. Cl.[7] ................................................. B60N 2/42
(52) U.S. Cl. ............................ 297/216.13; 297/216.19; 297/354.14; 297/216.14; 297/440.15; 296/65.09
(58) Field of Search ........................ 297/216.1, 216.13, 297/216.14, 216.19, 216.15, 378.11, 354.14, 354.12, 440.15; 296/68.1, 65

(56) References Cited

U.S. PATENT DOCUMENTS

| 5,366,268 A | * | 11/1994 | Miller et al. ............. 297/216.1 |
| 5,390,980 A | * | 2/1995 | Premji et al. ........... 297/378.12 |
| 5,507,553 A | | 4/1996 | Nishizawa et al. |
| 5,651,514 A | | 7/1997 | Grilliot et al. |
| 5,882,072 A | * | 3/1999 | Morlock ................. 297/216.13 |
| 5,882,080 A | | 3/1999 | Houghtaling et al. |
| 6,050,637 A | * | 4/2000 | H.ang.land et al. ..... 297/216.14 |
| 6,179,379 B1 | * | 1/2001 | Andersson ............. 297/216.13 |
| 6,296,306 B1 | * | 10/2001 | Specht et al. .......... 297/216.14 |
| 6,520,577 B2 | * | 2/2003 | Kitagawa ............... 297/216.13 |
| 6,523,892 B1 | * | 2/2003 | Kage et al. ............ 297/216.13 |

* cited by examiner

Primary Examiner—Peter M. Cuomo
Assistant Examiner—Erika Garrett
(74) Attorney, Agent, or Firm—Bill C. Panagos (57) ABSTRACT

A vehicle seat having a seat bottom and a seat back pivotally connected to the seat bottom. The vehicle seat also has a recliner mechanism for adjusting the angle between the seat back and the seat bottom. The recliner is capable of substantially supporting the seat back relative to the seat bottom below a threshold force acting on said seat back during normal operating loads. The operating loads are below a threshold level. The seat also has an impact control mechanism operatively connected to the seat back and the seat bottom. The impact control mechanism is operable between a disengaged position and an engaged position. In the disengaged position, the seat back is permitted to move relative to said seat bottom. In an engaged position, the impact control mechanism restrains the seat back from moving relative to the seat bottom.

20 Claims, 6 Drawing Sheets

VEHICLE SEAT RECLINE AND IMPACT CONTROL MECHANISM

This application claims the benefit of Provisional application Ser. No. 60/352,035, filed Oct. 25, 2001.

BACKGROUND OF THE INVENTION

This invention relates in general to reclining or folding seats in a vehicle and more specifically to latches controlling the pivoting motion of such seats. The seat latch system of the present invention, as disclosed herein, relates specifically to a combined recliner latch and vehicle seat locking mechanism.

Many automobiles include two rows of seats: a front row of seats and a rear row of seats. Especially for two door vehicles, the front seats often have mechanisms which allow the front row of seats to recline or move forward a relatively large amount to allow easy entry or access to the rear row of seats. Forward reclining of seats is commonly referred to as dumping. Conventional mechanisms include latches which permit the manual unlatching of the front row seat back recliner to pivot in a forward direction. After the rear row occupant is seated, the seat can be moved rearward back to its normal position. Some vehicle seats are also equipped with recliners which adjust the angle of the front seat back relative to the seat bottom for occupant comfort. To provide easy rear seat entry, these conventional seats include an additional mechanical latch which disengages the linkages to permit the seat back to be manually pivoted forward by a relatively large amount.

Seat latches are designed to sustain large forces during normal use, e.g. the weight and movement of the occupant, and even larger forces during an impact. Under vehicle impact conditions, large impact forces may be delivered to the seat back regardless of whether it is a rearward or frontal impact. In a rearward impact, the occupant is forced against the seat back, and the seat may experience a large energy pulse. Similarly, in a forward impact, and particularly in vehicle seats which incorporate a seat belt restraint system that is directly connected to the seat back, the occupant could engage the restraint system and therefore cause a relatively large energy pulse or force to act on the seat back via the restraint system. The latching devices of the present invention, as disclosed herein, can be adapted to be attached between a seat back, a seat bottom, and/or a seat track.

In the past, latching mechanisms that controlled reclining and dumping to provide sufficient support against large forces were often bulky or required multiple or separate devices to perform the respective tasks. These bulky devices were also relatively heavy and expensive. Additionally, these bulky devices made reclining or dumping the seat more difficult since larger forces were required to move the mechanisms.

DETAILED DESCRIPTION OF THE INVENTION

Preliminarily, it should be noted that certain terms used herein, such as "upper", "lower", "top", "bottom", "front", "back", "backward", "forward", "left", "right", "height", "width", "length", and "side", are used to facilitate the description of the preferred embodiment of the invention. Unless otherwise specified or made apparent by the context of the discussion, such terms should be interpreted with reference to the figure under discussion. Such terms are not intended as a limitation on the position in which the components of the invention may be used. Indeed, it is contemplated that the components of the invention may be easily positioned in any desired orientation for use.

Figure 1:
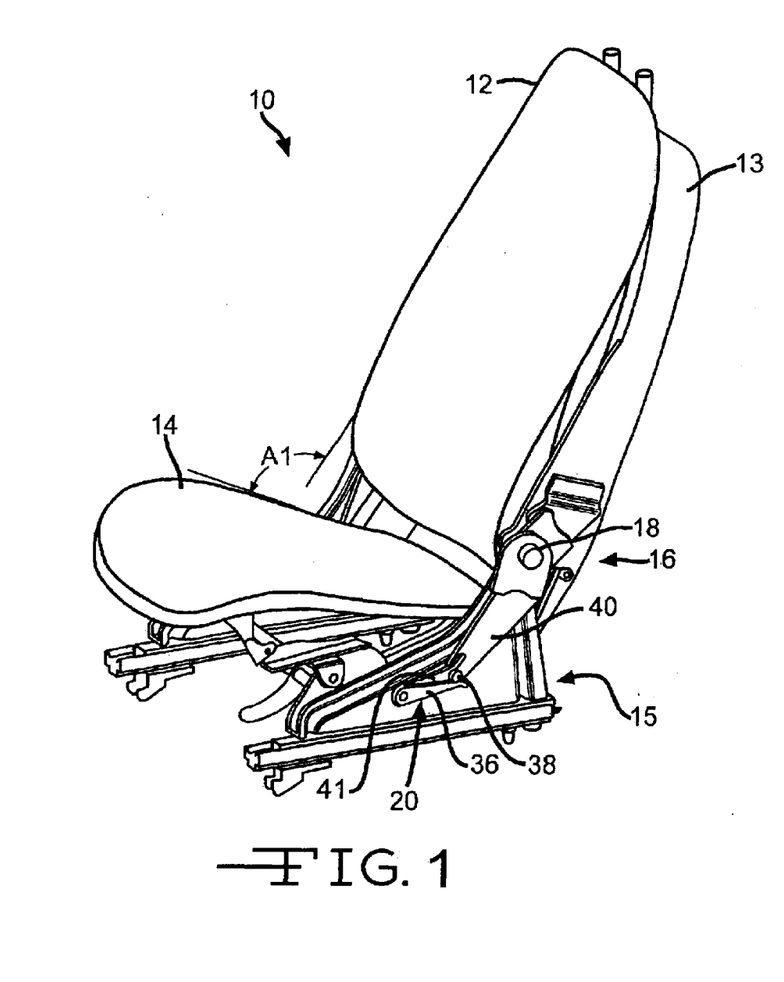
FIG. 1 is a perspective view of a vehicle seat in an upright position having the recliner, dump and impact control mechanisms of the present invention.
Figure 8:
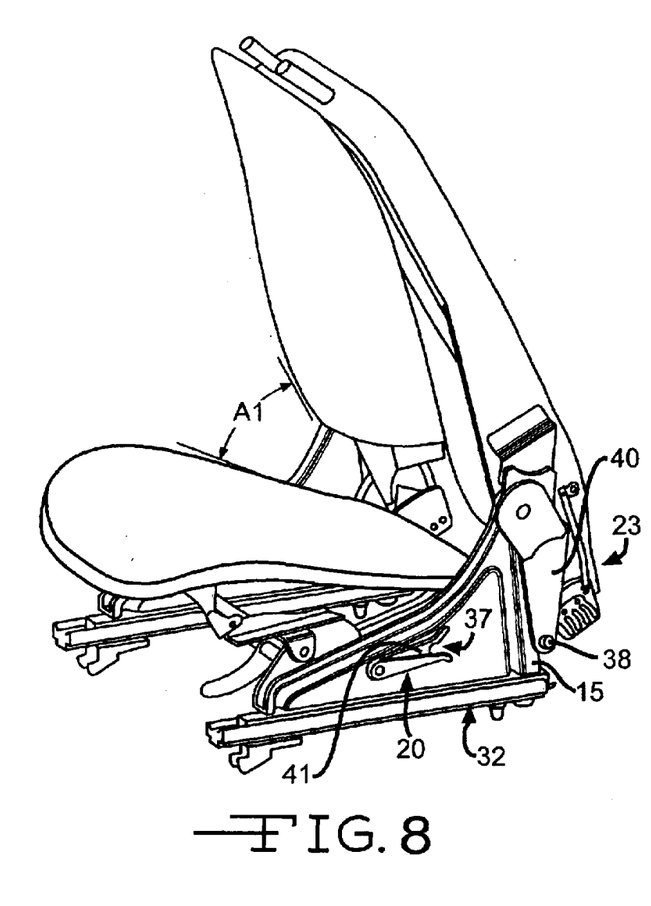
FIG. 8 is a perspective view of the vehicle seat of FIG. 1 in a dump position.

Referring now to FIG. 1, a vehicle seat assembly, in accordance with this invention, is illustrated and indicated generally at 10. The vehicle seat assembly 10 is ideally suited for a front seat of a two door vehicle but can be used for any seat position. The vehicle seat assembly 10 includes a generally vertical upper seat back 12 connected to a seat back support member 13. The seat back 12 is operatively connected to a generally horizontal seat bottom 14 through a support assembly 15 and preferably at a pivot 16. When an occupant is seated in the vehicle seat assembly 10, the seat back 12 is disposed at an angle A1, generally within the range of from about 140 degrees to about 90 degrees to the seat bottom 14. It should be noted that the seat back 12 and seat bottom 14 may be positioned at any suitable angle with respect to each other, preferably at an angle to provide maximum comfort and safety to one or more passengers. The adjustment of the seat angle A1 is generally controlled by a recliner mechanism, indicated schematically at 18. A portion of the recliner mechanism 18 is shown in FIG. 1 and is more clearly shown in FIGS. 2 and 3 and is described in more detail below. Likewise, when the vehicle seat assembly 10 is unoccupied, the angle A1 may be any suitable angle as well, including zero. When the seat back 12 is adjusted in a forward position (at an angle that is less than 90 degrees to the seat bottom), the seat back 12 can be considered to be in a dump position, as shown in FIG. 8. The seat dump mechanism 20 is described further below.

Figure 2:
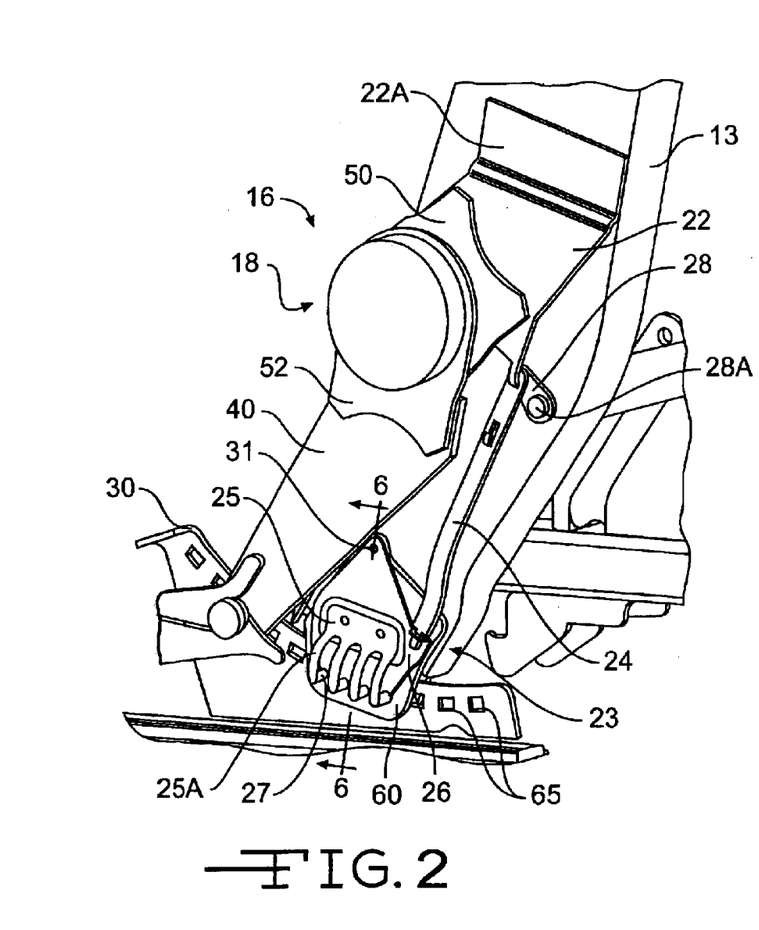
FIG. 2 is a perspective view of the recline and impact control mechanisms with the impact control mechanism in a disengaged position.

Referring now to FIG. 2, depicted is a perspective view of a portion of the recliner mechanism 18 and impact control mechanism 23 as shown in FIG. 1. The recliner mechanism 18 is generally designed to allow the occupant to adjust the angle A1 between the seat back 12 and seat bottom 14, as described above. An additional function of the recliner mechanism 18 is to support the normal operating loads acting on the seat 10. Normal operating loads include supporting the weight of the occupant, resisting forces due to the weight of the occupant while shifting in the seat or during braking, and supporting minor impact forces. Minor impact forces are forces due to collisions at no or low speed, or those forces due to hard braking events. While some of the forces upon the seat 10 are described as impact forces, it should be understood that these forces can be caused by any source. The recliner mechanism 18 is preferably designed to support a maximum operating load that is at a set threshold level or force. The threshold level is preferably a level that is able to support an occupant's weight and movement during normal and minor impact loading as described above. As will be described below, an impact control mechanism 23 will be actuated at loads above the threshold level to support the seat back 12 relative to the seat bottom 14. The actual recline device, shown schematically in FIG. 2, can be any suitable recline mechanism that allows the seat occupant to adjust the angle A1 of the seat back 12 relative to the seat bottom 14. A preferred embodiment of the recliner mechanism 18 is a manual device such as a hand crank device such as is conventional in the art to move plates 50 and 52 relative to each other. When the seat is moved into a recline position, the dump mechanism projection 38, pivots with the first arm 36 and catch 41 and remains engaged therewith.

The recliner 18 includes a deflection plate 22 which is preferably fastened to the seat back support member 13 at an upper portion 22a. An intermediate plate 50 is fastened to the deflection plate 22. The recliner 18 further includes an extension plate 52 which is connected to a second arm 40, described below in more detail. The recliner 18 includes mechanisms (not shown) which can change the rotational relationship of the extension plate 52 relative to the intermediate plate 50. The extension plate 52 is typically fixed relative to the support assembly 15 since the dump mechanism 34 fixes the second arm 40 relative to the support assembly 15. Under normal operating loads the recliner deflection plate 22 is positioned as shown in FIG. 2 with the impact control mechanism 23 disengaged. If the seat back 12 is moved to a further reclined position or the seat 10 is absorbing forces below the threshold level, the deflection plate 22 preferably remains fixed relative to the seat back support member 13 such that the parts of the impact control mechanism, indicated generally at 23, do not substantially move and therefore the impact control mechanism 23 remains disengaged. The deflection plate 22 is connected to a release plate 26 by a connecting arm 24. The upper portion of the connecting arm 24 is preferably pivotally connected to a lower portion of the deflection plate 22 with the aid of a pivot link 28 pivotally connected to the seat back support member 13 at a pivot 28a. During normal operating loads, all these components remain generally fixed relative to each other thereby maintaining the impact control mechanism 23 in a disengaged position. Since the recliner mechanism 18 preferably only supports forces less than a threshold level, the structure of the recliner mechanism 18, including the deflection plate 22, can be made of a lighter, less expensive material. Preferably, only one recliner 18 is used and mounted on one side of the seat back 12. Since the recliner 18 only has to support normal operational loads, only one recliner 18 can be used, thereby reducing weight and costs.

Figure 3:
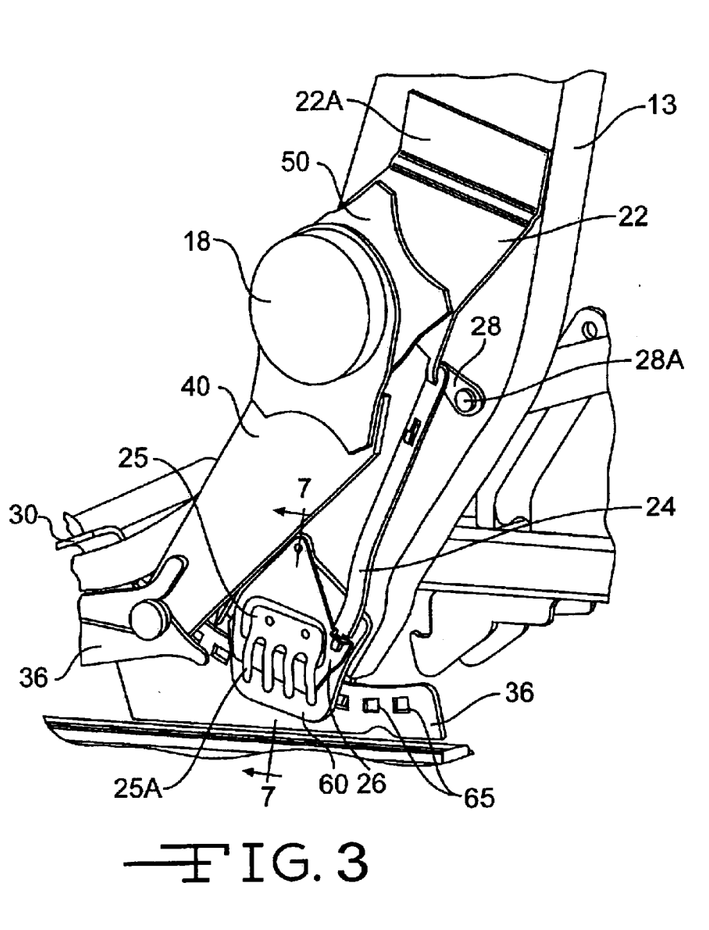
FIG. 3 is the recline and impact control mechanisms shown in FIG. 2 with the impact control mechanism in an engaged position.

As shown in FIG. 3, the apparatus of FIG. 2 is shown after a force greater than the threshold force has been applied to the structure of the recliner mechanism 18, via a force acting on the seat back support member 13. These relatively large forces deform the deflection plate 22, moving the lower portion of the plate upward or downward (depending on the direction of the applied force). A change in position of the deflection plate 22 causes rotation of the arm 24 about pivot 28a. When the arm 24 changes position, the release plate 26 also rotates about pivot 31 due to the change in position of the arm 24. The recliner deflection plate 22 is shown in FIG. 3 in a deformed position which causes the impact control mechanism 23 to engage. In an engaged position, the seat back 12 preferably maintains a generally fixed angular position relative to the seat bottom 14. This will allow the seat impact control mechanism 23 to absorb a greater amount of force vis-a-vis the occupant of the seat 10.

The components of the impact control mechanism 23 include the deflection plate 22, the connecting arm 24, the pivot link 28 and the release plate 26, described above. Additionally, the impact control mechanism 23 includes a crash latch 25 that has a plurality of fingers 25a extending therefrom. The fingers 25a engage or are attached to a corresponding plurality of pins 27 that are preferably spring-loaded and biased in a direction towards the support member 30 and are restrained in place against the release plate 26. It can be appreciated that a single finger and single pin design could also be used in accordance with the invention. The release plate 26 preferably has a serrated profile having a plurality of alternating tabs and slots that are offset relative to the pins 27 of the crash latch 25. When the impact control mechanism 23 is in its disengaged position the pins 27 contact the tabs 33 and are prevented from engaging the support member 30. For example, as shown in FIG. 2, the release plate 26 is positioned against guide plates 60 attached to the lower portion the seat back 13 and a side support member 30 having openings 65 formed therein formed in an arcuate pattern about the pivot 16. The guide plates 60 and the support member 30 are connected by any conventional means to the support assembly 15 which further connects the seat assembly to the vehicle frame. It is preferred that the guide plates 60 are positioned on both sides of the support member 30 and pivot with the seatback 12 and impact control mechanism 23. It is further preferred that the lower portion of the guide plates 60 have a plurality of apertures 61 formed therethrough such that the pins 27 can pass through the apertures of the guide plates 60 when the impact control mechanism 23 is engaged. Rotation of the release plate 26 relative to the seat back 12, such as can occur during a large impact load, will cause the pins 27 to move through the slots 35 of the release plate 26 around the tab portions 33 of the serrated profile and into engagement with the side support member 30. Of course, any suitable locking arrangement can be used between the release plate 26 and crash latch 25. Therefore, as the seat back 12 moves forward or backward under the relatively large impact force the deflection plate 22 will deform causing rotation of the release plate 26, thereby causing the impact control mechanism 23 to engage.

Figure 4:
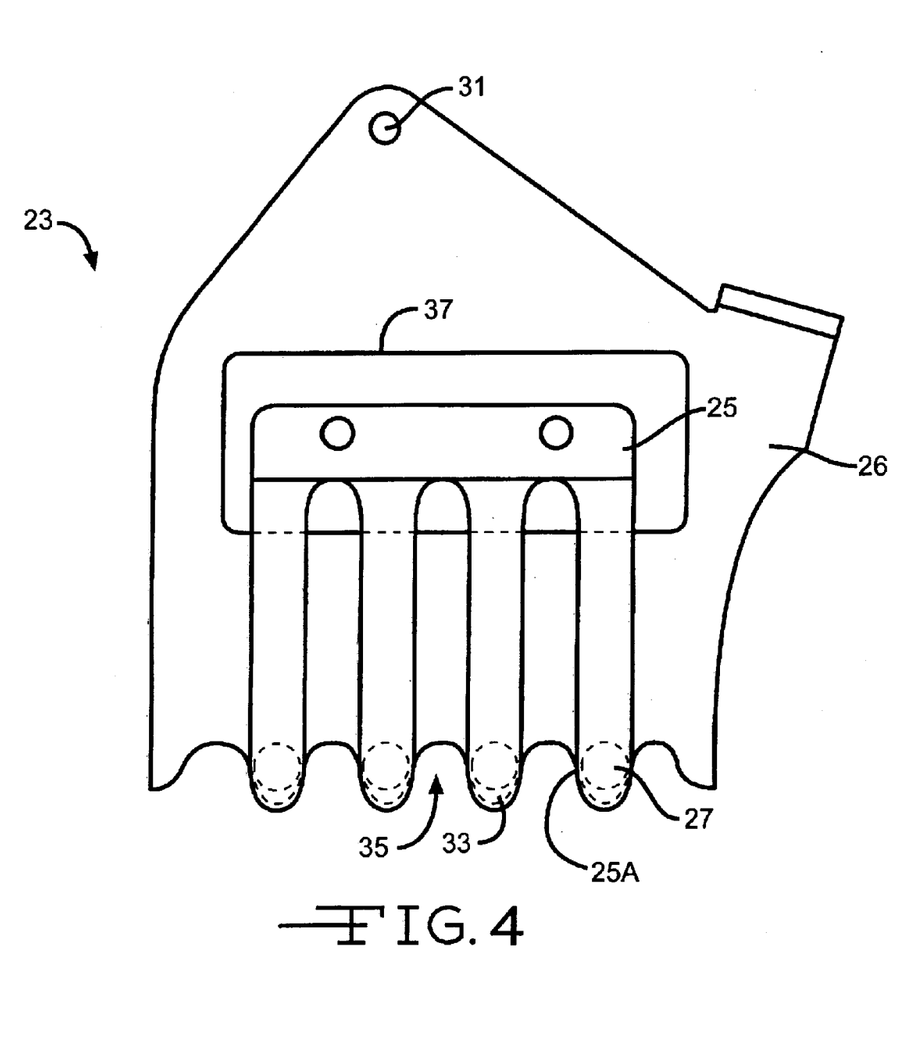
FIG. 4 is a side elevation view of the release plate, crash latch and pins in a non-engaged position.

Illustrated in FIG. 4 is the impact control mechanism 23 according to the present invention. Particularly, the crash latch 25, pins 27 and release plate 26 are illustrated in a disengaged position. The release plate 26 has a generally rectangular shape with a pivot point 31 wherein the plate 26 is attached to the seatback support member. Within the body of the plate 26, there is an opening 37 that is preferably sized such that the crash latch 25 can be positioned therein. The crash latch 25 is preferably directly attached to the seatback support member 13. Based on this structure, the release plate 26 can pivot about the pivot point 31 independently from the crash latch 25. The lower end of the release plate 26 preferably has a serrated profile defining a plurality of tabs 33 and slots 35. In the non-engaged or disengaged position, the tab portion 33 of the serrated profile prevents the pins 27 from passing beyond the release plate 26. Therefore, the release plate 26 is preferably positioned behind the crash latch 25 and engages a portion of the pins 27. The crash latch 25 is preferably connected to the seatback support member 13 and is positioned within the opening 37 formed on the release plate 26. The crash latch 25 also has a plurality of fingers 25a extending therefrom. At a distal end of the crash latch 25, the pins 27 preferably have a plurality of pins 27 formed thereon. Alternatively, the fingers 25a could be adapted to engage pins 27 that are not integrally formed with the fingers 25a. It is preferred that the fingers 25a project away from the base of the crash latch 25 yet are somewhat resilient such that the fingers 25a press against the pins 27, forcing the pins 27 towards the seat and side support member 30. It should be appreciated that the invention can include a crash latch 25 having any number of fingers 25a, or have any suitable design that allows the latch 25 to bias pins 27 towards the side support member 30. The pins 27 are preferably generally cylindrical (but can have any suitable shape) and are adapted to move past the slots 35 and fit into the openings 65 formed in the seat support member 30.

Figure 5:
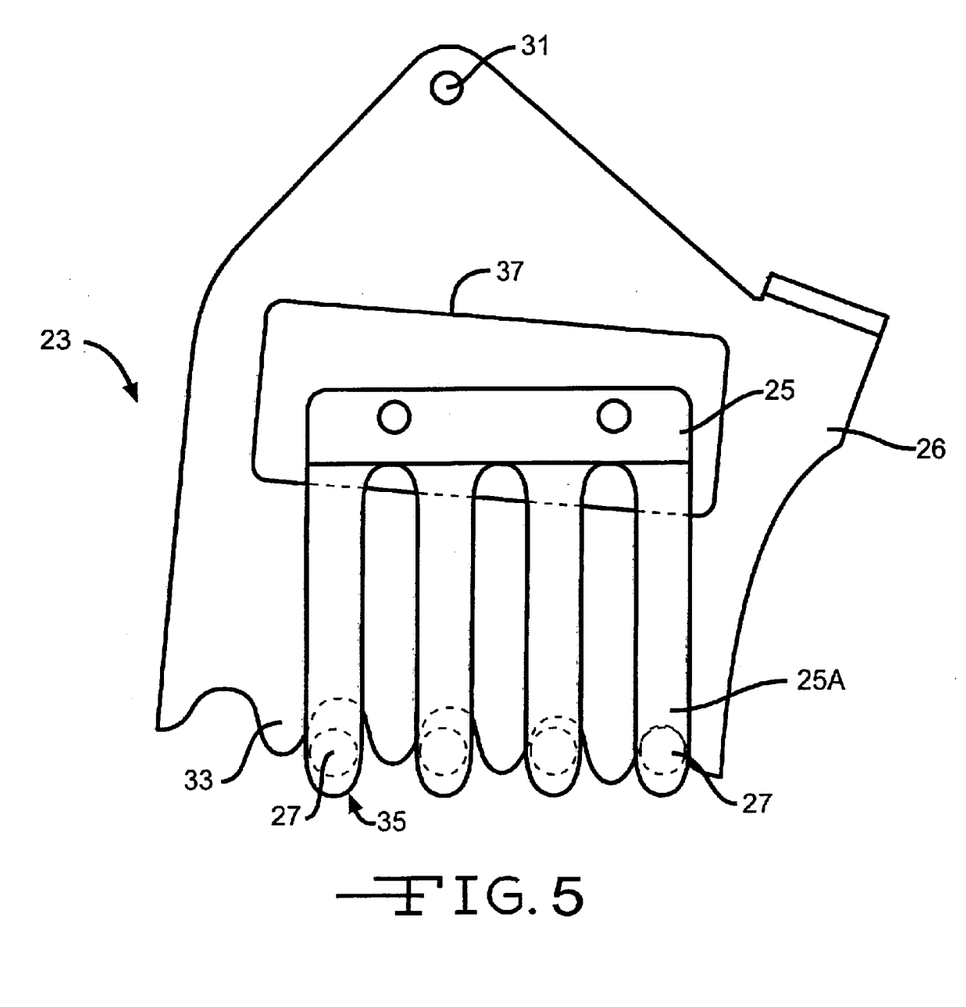
FIG. 5 is the apparatus of FIG. 4 shown in an engaged position.

Illustrated in FIG. 5 is the portion of the impact control mechanism of FIG. 4 shown in an engaged position. The release plate 26 is shown in a shifted position, such as would occur when a force greater than a threshold force acts upon the seat thereby creating a need for the impact control mechanism 23 to actuate. Although the 20 release plate 26 is shown shifted in a first direction, it should be appreciated that the release plate 26 can also shift in a second direction. As the release plate 26 shifts, the tabs 33 move away from the pins 27 thereby exposing the pins 27 to the slots 35. When the pins 27 are aligned with the slots 35 of the release plate 26, the fingers 25a of the crash latch 25 move the pins 27 through the slots 35 and into engagement with the support member 30.

Figure 6:
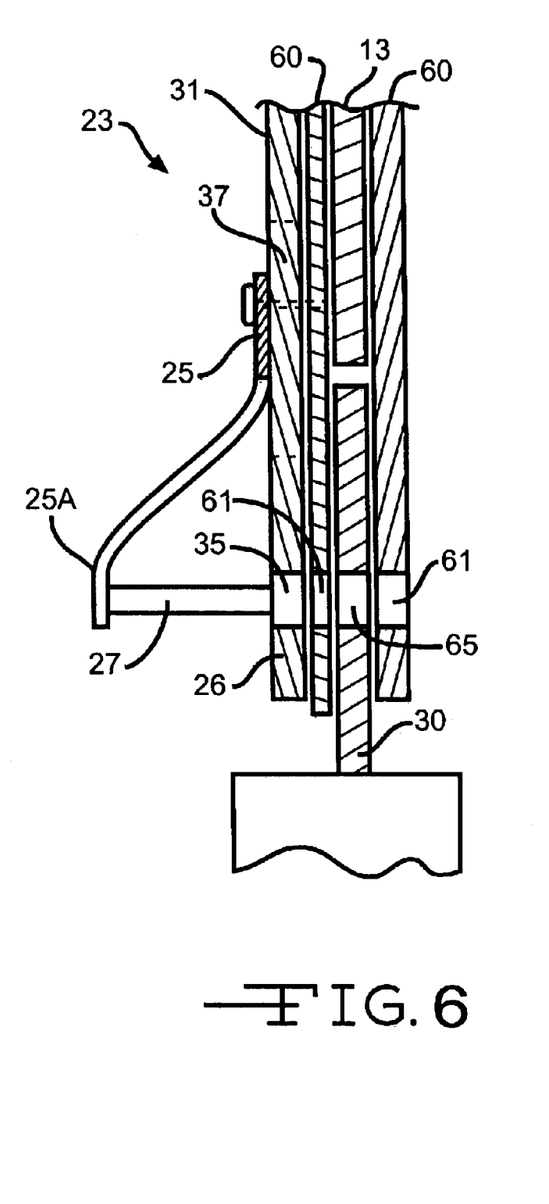
FIG. 6 is a cross-sectional view of the impact control mechanism of the present invention through Line 6—6 illustrated in FIG. 2.

Illustrated in FIG. 6 is a cross sectional view of the impact control mechanism through line 6—6 of FIG. 2. In this view the impact control mechanism 23 is in a disengaged position similar to that described with respect to FIG. 4. The seat back support member 13 is positioned generally above the center rail of the side support member 30. Connected to the seatback support member 13 are a pair of guide plates 60 that are positioned on either side of the seatback support member 13. The guide plates 60 are preferably attached to the seatback support member 13 such that the guide plates 60 only pivot with the seatback 12 and not with the release plate 26. The guide plates 60 have a plurality of openings 61 that are adapted to allow the pins 27 to pass therethrough when the pins 27 are aligned with the slots 35 of the release plate 26 and the openings 65 in the side support member 30. Pivotably attached to the outer guide plate 60 and seatback support member 13 is the release plate 26. As described above, the release plate 26 shifts when the arm 24 is moved due to a deflection of the deflection plate 22 by a force applied to the seat. The release plate 26 preferably pivots about a pivot point 31 such that the release plate 26 can move relatively easily with respect to the force applied by the motion of the arm 24. Formed within the release plate 26 is an opening 37 that allows the crash latch 25 to be affixed to the guide plate 60 or seatback support member 13. The size of the opening 37 is preferably such that the release plate 26 can pivot without interfering with the crash latch 26. Positioned within the opening 37 is the crash latch 25. The crash latch 25 is attached to the seat as described above. At least one finger 25a, and preferably a plurality of fingers, extends from the crash latch 25 and engage a pin 27 or pins at a distal end. As illustrated, the pins 27 engage the tab portions 33 of the release plate 26.

Figure 7:
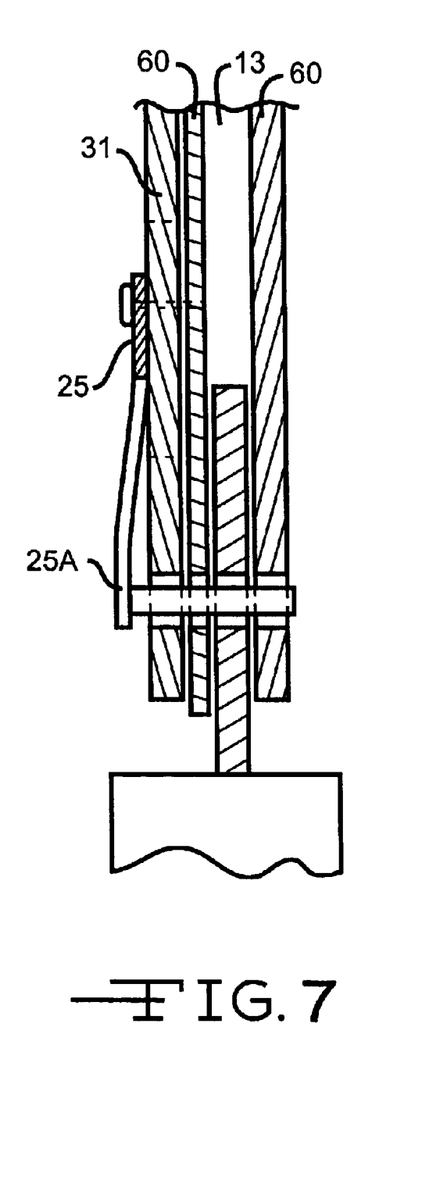
FIG. 7 is a cross-sectional view of the impact control mechanism of the present invention through Line 7—7 illustrated in FIG. 3.

Shown in FIG. 7 is a cross-sectional view of the impact control mechanism 23 through line 7—7 of FIG. 3. In this view, the impact control mechanism 23 is in an engaged position. Therefore, the release plate 26 has been shifted, as described above. Upon the shifting of the release plate 26, the tabs 33 of the release plate 26 also shift thereby allowing the pins 27 to pass through the slots 35 of the release plate 26, the openings 61 in the first guide plate 60, the openings 65 of the side support member 30, and the openings 61 of the second guide plate 60. The fingers 25a of the crash latch 25, therefore, preferably are adapted to resile against the release plate 26 such that when the release plate is shifted, the fingers 25a press the pins 27 into engagement with the guide plates 60 and side support member 30. It is preferred that the pins 27 protrude through the guide plates 60 and side support member 30 due to the increased structural stability such a configuration provides. Particularly, a force would have to shear the pins 27 in order to cause the impact control mechanism 23 to fail. If the pin 27 only engaged a finger 25a and the side support member 30, it might be possible for the members to deform with respect to each other allowing the pin 27 to "pop out" of engagement with the side support member 30. Causing a pin 27 to shear is generally more difficult to accomplish.

Referring now to FIG. 8, the vehicle seat assembly 10 is shown with the seat back 12 in a dump position and at an angle A1 less than 90 degrees relative to the seat bottom 14. The seat dump mechanism, indicated generally at 20, is preferably operable in a positioning mode to change the rotational position of the seat back 12 relative to the seat bottom 14 in a forward manner having a relatively small angle A1 to permit access to a rear seat area, for example. In a preferred embodiment, the seat bottom 14 is fixed to a track assembly 32 which provides fore and aft movement of the seat 10 relative to the vehicle (not shown). The track assembly 32 is preferably operatively connected to the vehicle frame (not shown). The dump mechanism 20 includes a dump latch (not shown) that activates the dump mechanism 20.

As shown in FIG. 8, the dump mechanism 20 further includes a first arm 36 that is pivotally connected at one end to a support member 15 that is connected to the upper seat rail of the seat 10. At a second end, the first arm 36 includes a recess 37 that accepts a projection 38 of a second arm 40. The second arm 40 is preferably connected at a second end to a portion of the recliner 18 or a portion of the seat back support member 13. The second arm 40 and the seat back support member 13 are preferably fixed with respect to one another and pivoted to the support member 15 about the pivot 16. A catch 41 is preferably fixed to the support member 15 and prevents the projection 38 of the second arm 40 from moving upward. When the dump latch mechanism 20 is activated, the first arm 36 is pivoted downwardly, as seen in FIG. 8, thereby releasing the projection 38 from the recess 37 to permit the second arm 40 and seat back support member 13 to rotate about the pivot 16 in a generally counter-clockwise direction, as viewing FIG. 8. The seat 10 can be positioned so that the angle A1 between the seat back 12 and seat bottom 14 is less than 90 degrees. Sufficient return motion of the seat back 12 in a generally clockwise direction will relatch the dump mechanism 20 as shown in FIG. 8.

Preferably, the recline point and dump pivot are concentric with one another and located relatively high on the seat back 12, so that the same pivot axis is suitable for both functions. However, the axis of the recliner and dump mechanisms could be eccentric if so desired. By positioning the dump pivot point at a relatively high position will allow the seat back 12 to fold over the seat bottom 14 and particularly a generally thick seat cushion, thereby allowing the position angle A1 to be near zero, with the seat back 12 near horizontal.

The dump latch mechanism 20 can also be used to move the seat back 12 to a generally horizontal position so that the back surface of the seat back can be used as a table. The back surface of the seat back 12 can optionally have any suitable structures to perform this function, such as cup holders, storage compartments, etc.

Figure 9:
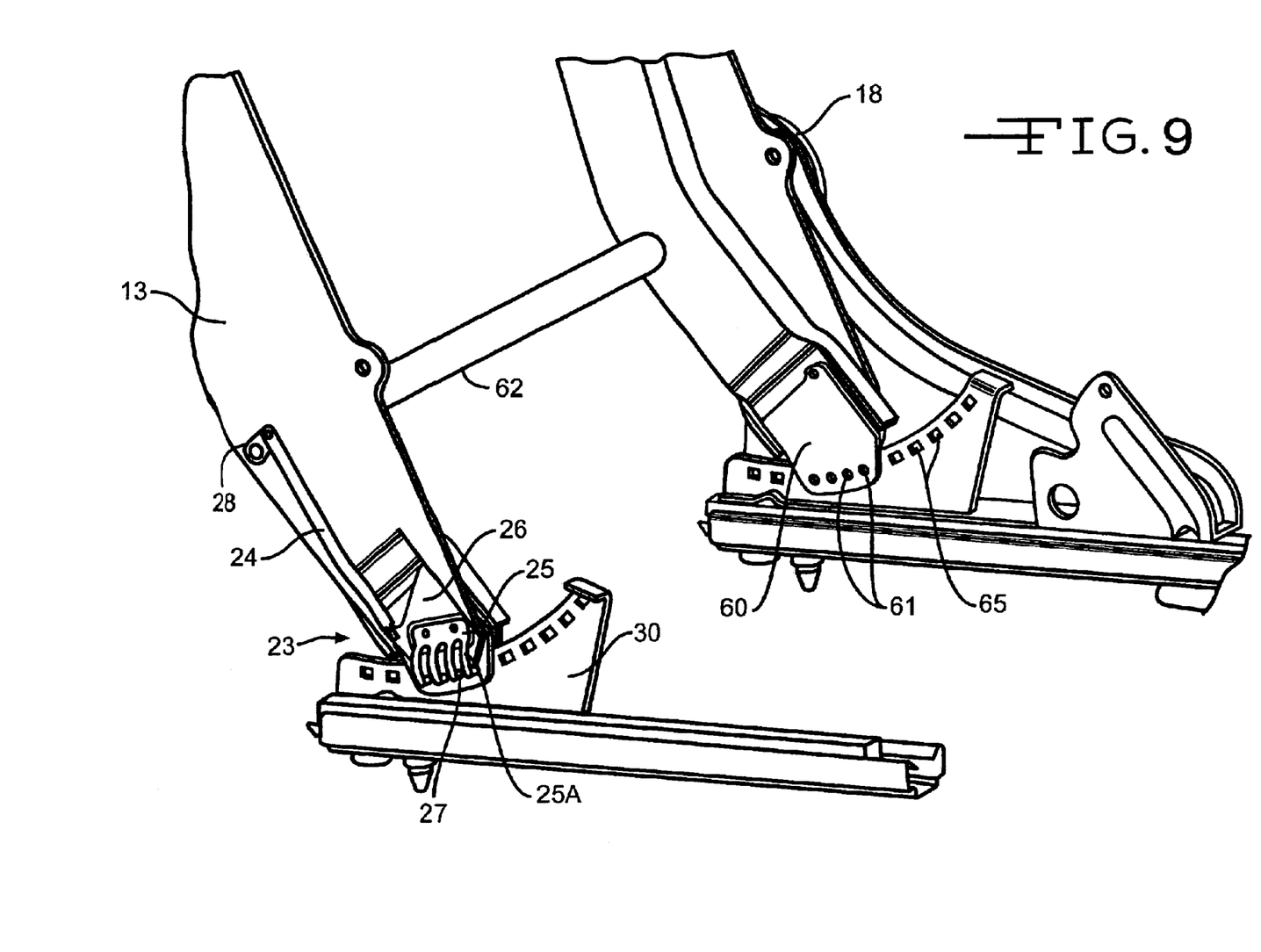
FIG. 9 is a perspective view of a vehicle seat having the impact control mechanism of the present invention further illustrating another side of the seat back support member.

Illustrated in FIG. 9 is an alternate embodiment of the present invention. As stated above, a single recliner mechanism 18 is positioned on one side of the seat 10. Preferably, however, both sides of the seat back support member 13 are equipped with impact control mechanisms 23, as shown in FIG. 9, to provide additional support during high impact loads. Additionally, it is preferred that the impact control mechanism 23 is made of a stronger material than the recliner mechanism 18 such that the impact control mechanism 23 can tolerate a larger application of force.

In a preferred embodiment with the impact control mechanism 23 on both sides of the seat back support member 13, the mechanism further includes a second pivoting link 28 and an impact control mechanism 23 (connecting arm 24, release plate 26, crash latch 25, support member 30, side plates 60). A connecting rod 62 can be located between the pair of pivot links 28 on either side of the support member 12 to cause simultaneous rotation of the links 28 to rotate the respective release plates 26 for engagement of the pair of impact control mechanisms 23. Operation of the impact control mechanism 23 would be substantially as with respect to the above-described embodiments. Although the recline and dump mechanisms are only shown on one side of the vehicle seat as illustrated in FIG. 9, it should be understood that the recline and dump mechanism can be on either or both sides of a seat.

The principle and mode of operation of this invention have been described in its preferred embodiments. However, it should be noted that this invention may be practiced otherwise than as specifically illustrated and described without departing from its scope.

What is claimed is:

1. A vehicle seat comprising:
    a seat bottom connected to a vehicle by a seat support member;
    a seat back pivotally connected to the seat bottom;
    a recliner mechanism for adjusting the angle between said seat back and said seat bottom, said recliner capable of substantially supporting said seat back relative to said seat bottom below a force acting on said seat back during normal operating loads;
    an impact control mechanism operatively connected to said seat back and said seat bottom, said impact control mechanism being operable between a disengaged position, wherein said impact control mechanism permits said seat back to move relative to said seat bottom, and an engaged position, wherein said impact control mechanism restrains said seat back from moving relative to said seat bottom;
    wherein said impact control mechanism is operatively connected with said seat back, and said impact control mechanism is activated by a force that is above a threshold force and acting upon the seat back; and
    wherein a deflection member attached to said seat back deforms when the force acting on said seat back is above said threshold force, said deformation causing actuation of said impact control mechanism from said disengaged position to said engaged position.

2. The seat defined in claim 1 wherein said impact control mechanism further comprises:
    a release plate movable between a first and second position; and
    a crash latch;
    wherein said release plate, in a first position, prevents said crash latch from engaging said seat support member; and
    wherein deflection of said deflection member causes said release plate to move into the second position thereby disengaging said crash latch and allowing said crash latch to engage said seat support member.

3. The seat defined in claim 2 wherein said crash latch further comprises a plurality of pins wherein said pins engage said release plate when the impact control mechanism is disengaged, and said pins engage said support member when the impact control mechanism is engaged.

4. The seat defined in claim 2 wherein an arm connects said deflection member to said release plate.

5. The seat defined in claim 1 further includes a dump mechanism connected to said recliner mechanism or said seat back to permit forward dumping of said seat back relative to said seat bottom.

6. The seat defined in claim 1 wherein said impact control mechanism is positioned on both sides of said vehicle seat.

7. The seat defined in claim 6 wherein said impact control mechanism further comprises:
    a deflection member located on at least one side of said seat;
    a pair of arms positioned on both sides of said seat wherein one of said arms is connected to said deflection member at a first end, one of said arms is connected to a pivot at a first end, and both arms are connected at second ends to a pair of release plates, said pair of release plates being movable between a first and second position; and
    a pair of crash latches;
    wherein said release plates, in a first position, prevent said crash latches from engaging said seat support members; and
    wherein deflection of said deflection member causes said release plates to move into the second position thereby disengaging said crash latches and allowing said crash latches to engage said seat support member.

8. The seat defined in claim 7 wherein a connecting rod connects said first arm to said second arm, wherein deflection of said deflection member causes said first arm, said connecting rod, and said second arm to pivot.

9. The impact control mechanism defined in claim 8 wherein said seat support member includes a plurality of holes formed therein, said holes being adapted to receive a plurality of pins extending from said crash latch when said impact control mechanism is engaged.

10. The impact control mechanism defined in claim 9 wherein said crash latch further comprises a plurality of fingers, said fingers biasing said pins towards said seat support member.

11. The impact control mechanism defined in claim 10 wherein said release latch has a serrated end defining a plurality of tabs and slots, wherein said tabs engage said pins when the impact control mechanism is disengaged and said pins pass through said slots when said impact control mechanism is engaged.

12. An impact control mechanism for a vehicle seat having a seatback and a seat bottom pivotably connected together comprising:

a deflection plate connected to said seatback, wherein said deflection plate is adapted to deflect when a force greater than a threshold level is applied to said seatback;

a connecting arm;

a release plate, wherein said connecting arm is attached at a first end to said deflection plate and at a second end to said release plate; and a crash latch;

wherein deflection of said deflection plate causes said connecting arm to pivot said release plate; and wherein said pivoting of said release plate causes said crash latch to engage a seat support member, wherein said seat support member connects said seat to a vehicle; and wherein said seat support member includes a plurality of holes formed therein, said holes being adapted to receive a plurality of pins extending from said crash latch when said impact control mechanism is engaged.

13. The impact control mechanism defined in claim 12 wherein said crash latch further comprises a plurality of fingers, said fingers biasing said pins towards said seat support member.

14. The impact control mechanism defined in claim 12 wherein said release latch has a serrated end defining a plurality of tabs and slots, wherein said tabs engage said pins when the impact control mechanism is disengaged and said pins pass through said slots when said impact control mechanism is engaged.

15. The seat defined in claim 1 wherein said deflection member is attached to said recliner mechanism.

16. A vehicle seat comprising:

a seat bottom connected to a vehicle by a seat support member;

a seat back pivotally connected to the seat bottom;

a recliner mechanism for adjusting the angle between said seat back and said seat bottom, said recliner capable of substantially supporting, in a plurality of angled positions, said seat back relative to said seat bottom below a force acting on said seat back during normal operating loads;

an impact control mechanism operatively connected to said seat back and said seat bottom, said impact control mechanism being operable between a disengaged position, wherein said impact control mechanism permits said seat back to move relative to said seat bottom, and an engaged position, wherein said impact control mechanism restrains said seat back from moving relative to said seat bottom;

wherein said impact control mechanism is positioned on both sides of said vehicle seat.

17. The vehicle seat defined in claim 16 wherein a deflection member attached to said seat back deforms when a force acting on said seat back is above a threshold force, said deformation causes actuation of said impact control mechanism from said disengaged position to said engaged position.

18. The vehicle seat defined in claim 17 wherein said impact control mechanism further comprises:

a release plate movable between a first and second position; and a crash latch;

wherein said release plate, in a first position, prevents said crash latch from engaging said seat support member, and wherein deformation of said deflection member causes said release plate to move into the second position thereby disengaging said crash latch and allowing said crash latch to engage said seat support member.

19. The vehicle seat defined in claim 18 wherein an arm connects said deflection member to said release plate.

20. The vehicle seat defined in claim 17 further comprising a dump mechanism connected to said recliner mechanism or said seat back to permit forward dumping of said seat back relative to said seat bottom.

* * * * *